(12) United States Patent
Miller

(10) Patent No.: US 7,124,361 B2
(45) Date of Patent: Oct. 17, 2006

(54) APPARATUS AND METHOD FOR FORMING PROCESSED DATA

(75) Inventor: Robert A. Miller, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 793 days.

(21) Appl. No.: 09/814,304

(22) Filed: Mar. 21, 2001

(65) Prior Publication Data
US 2002/0138519 A1 Sep. 26, 2002

(51) Int. Cl.
G06F 17/24 (2006.01)

(52) U.S. Cl. .................................. 715/517
(58) Field of Classification Search ............ 715/518, 715/519, 517, 521, 525
See application file for complete search history.

(56) References Cited

U.S. PATENT DOCUMENTS

| | | | |
|---|---|---|---|
| 3,987,415 A | | 10/1976 | Boyd |
| 4,928,252 A | * | 5/1990 | Gabbe et al. ............... 715/525 |
| 5,002,408 A | | 3/1991 | Hamada et al. |
| 5,425,138 A | * | 6/1995 | Kumakawa ................. 715/510 |
| 6,389,437 B1 | * | 5/2002 | Stoub ........................ 715/523 |
| 6,453,078 B1 | * | 9/2002 | Bubie et al. ................ 715/517 |
| 6,547,830 B1 | * | 4/2003 | Mercer ....................... 715/518 |
| 6,603,493 B1 | * | 8/2003 | Lovell et al. ............... 715/800 |
| 6,633,401 B1 | * | 10/2003 | Kojima ...................... 358/1.15 |
| 6,670,968 B1 | * | 12/2003 | Schilit et al. ............ 715/501.1 |
| 6,825,860 B1 | * | 11/2004 | Hu et al. .................... 715/801 |

FOREIGN PATENT DOCUMENTS

| | | |
|---|---|---|
| EP | 0538059 A2 | 4/1993 |
| EP | 1189146 A1 | 3/2002 |
| GB | 2043311 A | 10/1980 |
| WO | WO99/39255 | 8/1999 |
| WO | WO01/16792 | 3/2001 |

OTHER PUBLICATIONS

Piroumian, Vartan; Java GUI Development: The Authoritative Solution, Chapter 8—"Layout Managers" (Sams Publishing, Aug. 25, 1999).*

* cited by examiner

Primary Examiner—Doug Hutton

(57) ABSTRACT

An apparatus for forming processed data includes a data storage device. Data storage device is connected to form engine. Form engine is connected to output device. Form engine formats processed data contained on data storage device in accordance with predetermined high level rules. In a preferred embodiment, predetermined high level rules use loose value trade-offs for formatting processed data. In a preferred embodiment, loose value trade-offs are selected from a group including: fit all data on one page; clearly defined text columns; bold face first line of new text; and shrink photos proportionally with text. In other preferred embodiment, sub level rules are added to loose value trade-offs.

12 Claims, 2 Drawing Sheets

APPARATUS AND METHOD FOR FORMING PROCESSED DATA

FIELD OF THE INVENTION

This invention relates to an apparatus and method for forming processed data. In particular, the invention relates to an apparatus and method for forming processed data in a system for creating documents from processed data.

BACKGROUND OF THE INVENTION

The prior art is replete with database processing systems. Database form packages are available that provide very detailed, "firm", rules for the construction of documents from processed data in every conceivable style. Nonetheless, while there is a wide variety of form packages, prior art database output is usually very flat. By "flat" it is meant that the document is created with few or limited stylistic components such as appropriate sizing, highlighting text and so forth. Coordinating graphics and text smoothly is another difficulty under these prior art "firm" rules. To date, as a result, database output is usually very flat unless it has a fixed format created by firm rules or unless it involves substantial manual formatting. The result of previous implementations is that documents are not created as the form designer intended them. Photos or text are clipped from the page, tables misaligned, text wrapped inappropriately, text or graphics pushed onto multiple pages, etc. The form engines of the prior art usually provide a default trade-off in fidelity, which often does not meet the designer's intent.

Thus, there is a need in the art for providing an apparatus and method for forming processed data that easily accommodates a wide variety of stylistic choices. It, therefore, is an object of this invention to provide an apparatus and method for forming processed data, in a system for creating documents from processed data, that is simple, powerful, intuitive and automated.

SHORT STATEMENT OF THE INVENTION

Accordingly, the apparatus for forming processed data, in a system for creating documents from processed data, includes a data storage device for storing the processed data. A form engine is connected to the data storage device for formatting the processed data in the storage device in accordance with predetermined high level rules. An output device is connected to the form engine for outputting formatted data created from the form engine. In a preferred embodiment, the predetermined high level rules use loose value trade offs for formatting processed data. In another preferred embodiment, the loose value trade-offs are selected from a group including: fit all data on one page; cleanly define text columns; bold face first line of new text; and shrink photos proportionally with text. In a preferred embodiment, the apparatus further includes sublevels of loose value trade offs. In another preferred embodiment the loose value trade-off—fit all data on one page—further includes sublevel loose value trade-offs: reduce font, shrink photos and graphics proportional with font, reduce length of some data fields, and shrink margin.

In another preferred embodiment, in a system for creating documents from processed data, a method of forming processed data includes the steps of providing a data storage device for storing processed data and adding processed data to the data storage device. A form engine is connected to the data storage device and formats the processed data in accordance with predetermined high level rules. An output device is connected to the form engine and outputs formatted data from the form engine.

In a preferred embodiment, the predetermined high level rules use loose value trade-offs for formatting processed data. In another preferred embodiment, the step is added for selecting the loose value trade-offs from a group including: fit all data on one page; cleanly define text columns; bold face to first line of new text; and shrink photos proportionally with text.

In a preferred embodiment the method includes the step of adding sublevels of loose value trade-offs. In another preferred embodiment the method includes the step of adding the sublevel loose value trade-offs such as: reduce font, shrink photos and graphics proportional with font, reduce length of some data fields, and shrink margins.

In another preferred embodiment, in a system for creating documents from processed data, computer code recorded on a computer readable medium for forming processed data includes computer code for a data storage system for storing processed data. Computer code for a form engine is linked to the data storage system for formatting the processed data in accordance with predetermined high level rules. A computer code for an output system is linked to the form engine for outputting formatted data created from the form engine processing. In a preferred embodiment, the predetermined rules further include computer code for using loose value trade-offs for formatting processed data. In another preferred embodiment, the computer code for using loose value trade-offs is selected from a group of computer code including: fit all data on one page; cleanly define text columns; bold face first line of new text; and shrink photos proportionally with text.

In a preferred embodiment, computer code is provided for sublevels of loose value trade-offs. Further, in a preferred embodiment the computer code for—fit all data on one page—includes computer code for the sublevel loose value trade-offs: reduce font, shrink photos and graphics proportional with font, reduce length of some data fields, and shrink margin.

BRIEF DESCRIPTION OF THE DRAWINGS

Other objects, features, and advantages of the present invention will become more fully apparent from the following detailed description of the preferred embodiment, the appended claims and the accompanying drawings in which:

DETAILED DESCRIPTION OF THE PREFERRED EMBODIMENT

Figure 1:
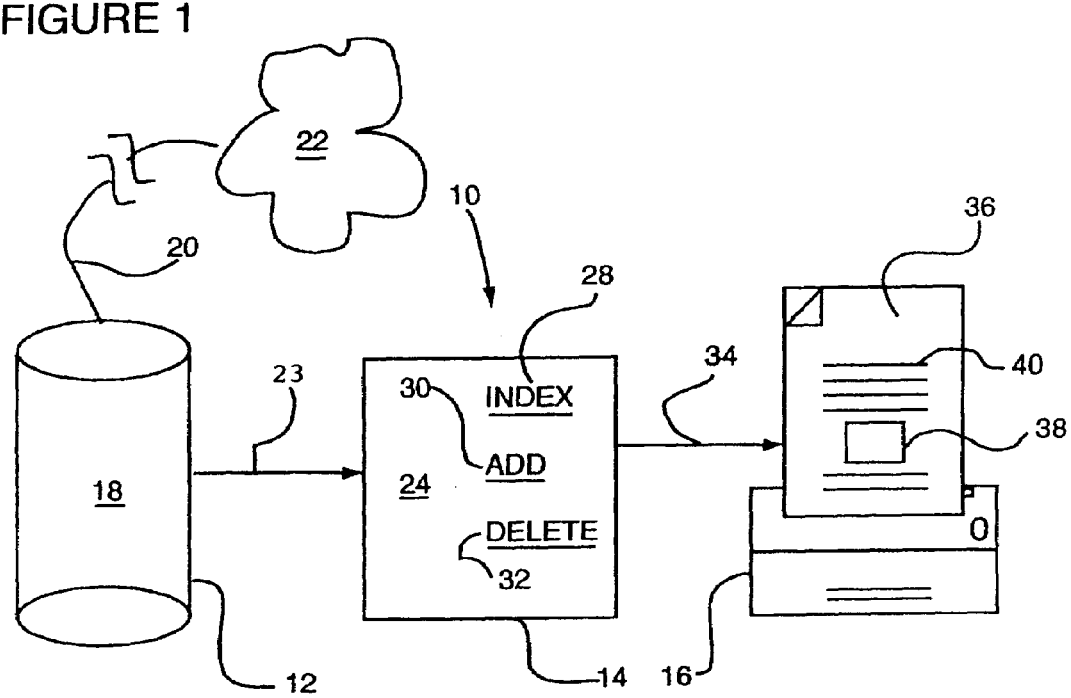
FIG. 1 is a schematic diagram of a preferred embodiment of the apparatus for forming processed data of the present invention.

The preferred embodiment of the present invention is illustrated by way of example in FIGS. 1–4. With specific reference to FIG. 1, an apparatus for forming data 10 includes the data storage device 12, form engine 14, and output device 16. Data storage device 12 contains processed data 18. Processed data 18 is delivered to data storage device 12 through connection 20. Connection 20 joins data storage device 12 with data input device 22. Data input device 22 is any device now known or hereafter developed for compiling and manipulating data, such as a computer system. Data input device 22 may in fact contain data storage device 12, such as in the nature of a hard drive on a PC, for example. Likewise, data input device 22 may be remotely connected to data storage device 12 through an Intranet and/or through the Internet.

Connection 23 joins data storage device 12 with form engine 14. Once again, any form of connection 23, hardwire, wireless, or the like, is appropriate. Hereto, data storage device 12 and form engine 14 may in fact reside on data input device 22 or be remotely connected, as is known in the art.

Form engine 14 contains a set of predetermined high level rules 24. An interface designer creates a set of predetermined high level rules 24 as suits the needs of a user and the capabilities of the data input devices 22 and output devices 16, as will be discussed more fully hereafter. As used herein, the term "high level rules" encompasses any data formatting rules that support a higher level of data formatting. In general, the high level rules are directed toward capturing the intent of the designer/user. For example the intent may be: I always want this form to fit on a single page. Thereafter, each data element on the page creates tradeoffs which attempt to meet the high level rule, for example make the text of this data element smaller to try to fit all of the data on one page. By way of example, only, and not by way of limitation, such high level of rules include rules which use loose value trade-offs 26 for formatting processed data. By way of further example, such loose value trade-offs 26 include, but again are not limited to: fit all data on one page; cleanly define text columns; bold face first line of new text; and shrink photos proportionally with text.

Still referring to FIG. 1, form engine 14 also includes index 28, add feature 30 and delete feature 32. Both the interface designer and the user may access index 28 so as to view high level rules 24 as well as to search for a desired high level rule 24 through the index 28, as is known in the art. Additionally, both interface designers and users may add to form engine 14 utilizing add feature 30 or subtract high level rules 24 from form engine 14 utilizing delete feature 32.

Form engine 14 is connected to output device 16 by means of connection 34. Connection 34 may be of any type now known or hereafter developed for transferring formatted processed data 18 from form engine 14 to output device 16. In a preferred embodiment, output device 16 is a printer. Output device 16, in any event, produces formatted document 36 in accordance with predetermined high level rules 24. Formatted document 36 may thus contain any stylistic formats provided for by predetermined high level rules 24 as determined by the interface designer and/or the user. Such stylistic choices include shrinking photo 38 proportionally with text 40, for example.

Figure 2:
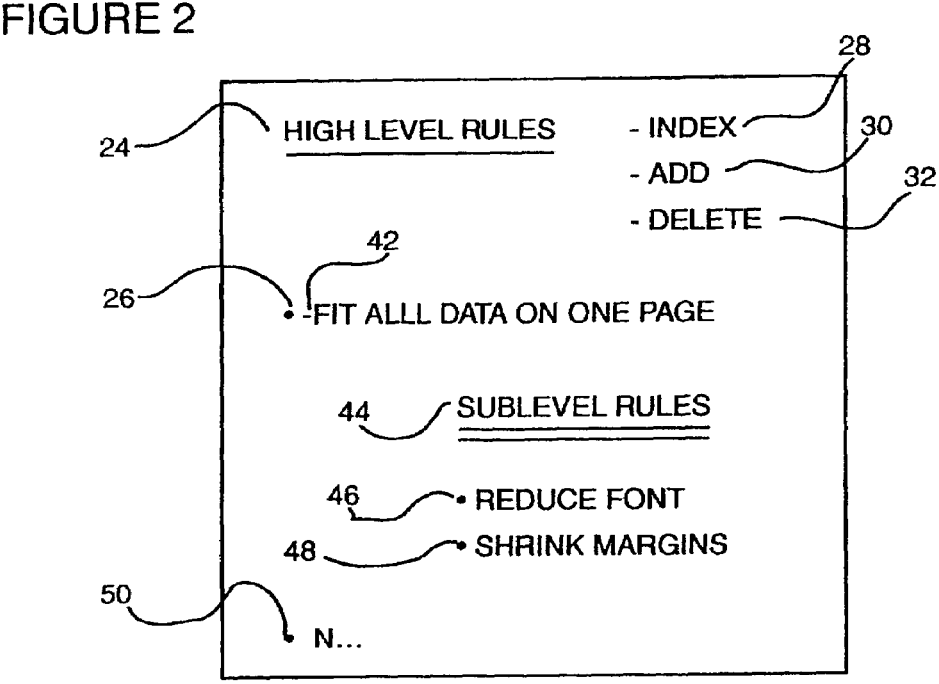
FIG. 2 is an illustration of details of the form engine of the present invention.

Referring now to FIG. 2, form engine 14 is more particularly described. Once again, form engine 14 includes high level rules 24. High level rules 24 use loose value trade-offs 26 for formatting processed data 18. Once again, loose value trade-offs 26 include, by way of example only, —fit all data on one page—42. In a preferred embodiment, loose value trade-offs 26 also include sublevel rules 44. Again, by way of example only, loose value trade-off 26, —fit all data on one page—42, includes, but is not limited to, sublevel rules 44, reduce font 46, shrink photos and graphics proportional with font, reduce length of some data fields, and shrink margins 48. Obviously, any number "N" 50 of high level rules 24, loose value trade-offs 26, and sub level rules 44 may be added.

Figure 3:
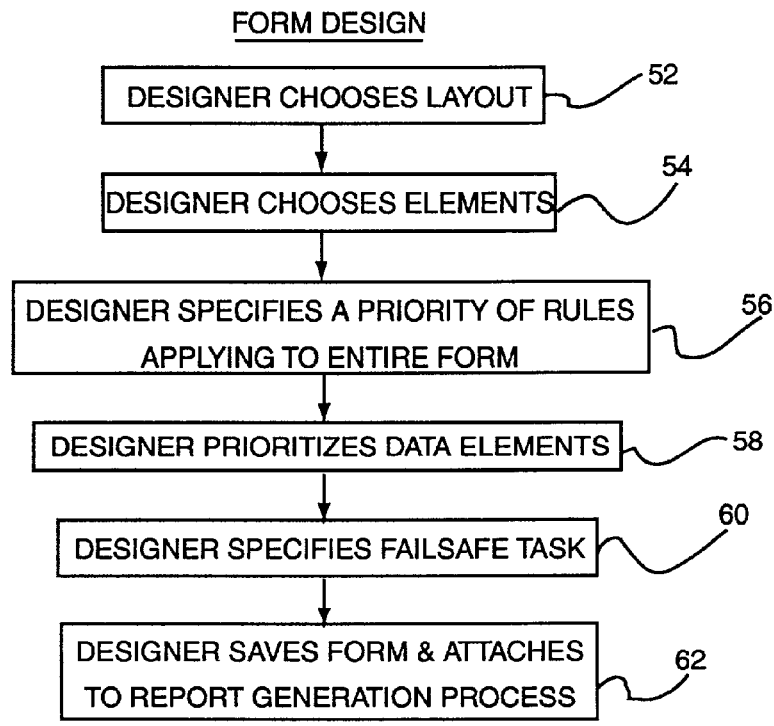
FIG. 3 is a form designer flow chart of the present invention.

Referring now to FIG. 3, the flow chart illustrating the steps of designing the format of a data set is disclosed. In step 52 a designer chooses the desired layout for the data. In step 54 the designer chooses the desired elements for each data file in the form of static text, dynamic text, static graphics, and dynamic graphics, for example. At step 56, the designer specifies a priority of rules applying to the entire form i.e. must fit on one page, etc. Next, at step 58, the designer specifies the priority order for each data element (what to change first) and what is the maximum it can be changed i.e. 12 point font can be reduced to 10 point font, but not further; multiple line field can be truncated to a maximum of 10 lines; inner line spacing can be reduced by up to 20%; shrink picture by up to 50%; and so forth. Then, at step 60, the designer specifies the final, fail safe, task which will be used if all previous formatting attempts fail, i.e. cut data to one page or wrap to two pages. Finally, at step 62, the designer saves the newly created form design and attaches it to a report generation process, printing, web page, etc., as discussed hereafter.

Figure 4:
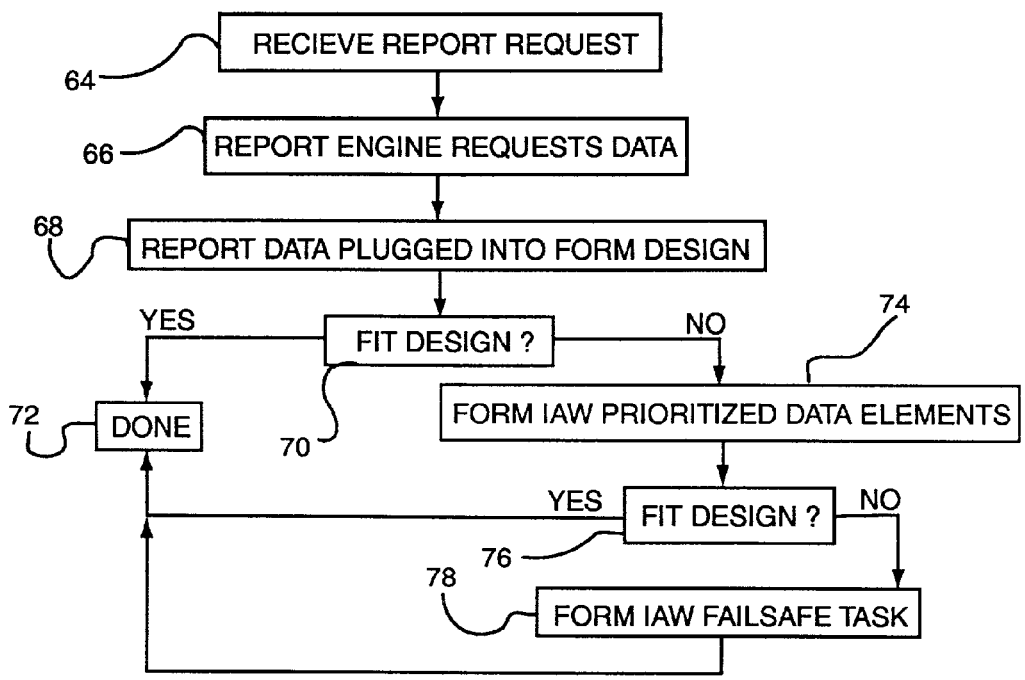
FIG. 4 is a report generation flow chart of the present invention.

Referring to FIG. 4, utilization of the present invention through the process of report generation is discussed. In step 64, the report generation process, as mentioned above, begins with the receipt of a computer generated or user requested (for example) form/report request. In step 66, the report/form engine 14 requests the dynamic data from the data storage device 12. In step 68, the report/form engine 14 plugs the dynamic data into the form design (as created in accordance with the steps described with regard to FIG. 3). If the form meets the form rules, i.e. fits on one page, at step 70 the process is done at step 72. If the form does not meet the form rules, the report/form engine 14 takes one or more of the previously prioritized data elements changes (See step 58 of FIG. 3) and starts modifying the values until the limits are reached or the high level rules are met. If there are multiple prioritized data elements, they are backed off evenly until they reach their limit or the high level rules are met in step 76 and the process is then done in step 72. If the report/form does not fit the design in step 76 after all the data element options have been used, the invention proceeds to step 78 where the report/form is formatted in accordance with the failsafe, final, rule to ensure a guaranteed output.

In operation, in a system for creating documents from processed data 18, data storage device 12 is provided for storing processed data 18. Processed data 18 is added to data storage device 12 by means of connection from data input device 22. Form engine 14 is connected to data storage device 12 by means of connection 23. Form engine 14 formats processed data 18 in accordance with predetermined high level rules 24. Form engine 14 is connected to output device 16 by means of connection 34. Output device 16, in a preferred embodiment, prints out formatted document 36. Formatted document 36 is simply and easily conformed by high level rules 24 so that, for example, photo 38 is proportional with text 40. Importantly, sub level rules 44 are provided for loose value trade-offs 26 for an even greater stylistic control of formatted document 36. The invention is applicable to a wide spectrum of formatting environments, including but not limited to, printers, web pages, electronic documents, and the like.

The apparatus and method for forming processed data 10 of the present invention is easily accommodated in the form of computer code as described above. Still further, the individual elements of invention 10 may be, in fact, incorporated in a single set of code.

While the present invention has been disclosed in connection with the preferred embodiment thereof, it is to be understood that there may be other embodiment which fall within the spirit and scope of the invention as defined by the following claims.

The invention claimed is:

1. A computerized method of formatting print data, comprising:
   establishing a higher level formatting rule for the print data;
   establishing a lower level formatting rule configured to change the print data to conform to the higher level rule;
   establishing a maximum of permitted change for the lower level rule; and
   applying the lower level rule to the print data until the rule is met or until the maximum of permitted change for the rule is reached, whichever occurs first.

2. The method of claim 1, further comprising:
   establishing a fail safe rule that when applied to the print data conforms the print data to the higher level rule; and
   applying the fail safe rule to the print data if applying the lower level rule to the print data does not conform the print data to the higher level rule.

3. A computer readable medium having computer code thereon for:
   establishing a higher level formatting rule for the print data;
   establishing a lower level formatting rule configured to change the print data to conform to the higher level rule;
   establishing a maximum of permitted change for the lower level rule; and
   applying the lower level rule to the print data until the rule is met or until the maximum of permitted change for the rule is reached, whichever occurs first.

4. The medium of claim 3 having code thereon for:
   establishing a fail safe rule that when applied to the print data conforms the print data to the higher level rule; and
   applying the fail safe rule to the print data if applying the lower level rule to the print data does not conform the print data to the higher level rule.

5. A computerized method of formatting print data, comprising:
   establishing a higher level formatting rule for the print data;
   establishing lower level formatting rules configured to change the print data to conform to the higher level rule;
   establishing a maximum of permitted than e for the lower level ruler;
   establishing a fail safe rule that when applied to the print data conforms the print data to the higher level rule;
   applying each lower level rule to the print data until the rule is met or until the maximum of permitted change for the rule is reached whichever occurs first; and
   applying the fail safe rule to the print data if applying the lower level rules to the print data does not conform the print data to the higher level rule.

6. The method of claim 5 wherein the higher level formatting rule comprises fitting all of the print data on one page end the fail safe rule comprises cutting the print data.

7. The method of claim 5 wherein the print data comprises data representing one or more of static text, dynamic text, static graphics or dynamic graphics.

8. The method of claim 5 wherein the higher level formatting rule comprises fitting all of the print data on one page and the lower level formatting rules include two or more of reducing a font, shrinking photos and graphics proportional with a font, reducing a length of some data fields, or shrinking a margin.

9. A computer readable medium having computer code thereon for:
   establishing a higher level formatting rule for the print data;
   establishing lower level formatting rules configured to change the print data to conform to the higher level rule;
   establishing a maximum of permitted change for the lower level rules;
   establishing a fail safe rule that when applied to the print data conforms the print data to the higher level rule;
   applying each lower level rule to the print data until the rule is met or until the maximum of permitted change for the rule is reached, whichever occurs first; and
   applying the fail safe rule to the print data if applying the lower level rules to the print data does not conform the print data to the higher level rule.

10. The medium of claim 9 wherein the higher level formatting rule comprises code for fitting all of the print data on one page and the fail safe rule comprises cutting the print data.

11. The medium of claim 9 wherein the print data comprises data representing one or more of static text, dynamic text, static graphics or dynamic graphics.

12. The medium of claim 9 wherein the higher level formatting rule comprises fitting all of the print data on one page and the lower level formatting rules include two or more of reducing a font, shrinking photos and graphics proportional with a font, reducing a length of some data fields, or shrinking a margin.

* * * * *

UNITED STATES PATENT AND TRADEMARK OFFICE
CERTIFICATE OF CORRECTION

PATENT NO. : 7,124,361 B2  Page 1 of 1
APPLICATION NO. : 09/814304
DATED : October 17, 2006
INVENTOR(S) : Robert A. Miller It is certified that error appears in the above-identified patent and that said Letters Patent is hereby corrected as shown below:

In column 4, line 50, after "connection" insert -- 20 --.

In column 5, line 52, in Claim 5, delete "than e" and insert -- change --, therefor.

In column 5, line 53, in Claim 5, delete "ruler" and insert -- rules --, therefor.

In column 6, line 5, in Claim 5, after "reached" insert -- , --.

In column 6, line 11, in Claim 6, delete "end" and insert -- and --, therefor.

Signed and Sealed this

Eighteenth Day of August, 2009

David J. Kappos
*Director of the United States Patent and Trademark Office*